2,933,475

CHELATES AND METHODS OF MAKING THE SAME

Fred W. Hoover and Henry C. Miller, Pembrey, near Wilmington, Del., assignors to E. I. du Pont de Nemours and Company, Wilmington, Del., a corporation of Delaware No Drawing. Application September 20, 1955
Serial No. 535,520

14 Claims. (Cl. 260—63)

This invention relates to the field of chelate complexes and their use in the preparation of shaped articles. More particularly, it relates to stable compositions from which high-softening, insoluble polymers can be obtained in useful shapes, and to the process of forming these high-softening, insoluble polymers.

This application is a continuation-in-part of our copending application Serial No. 380,602, filed September 16, 1953, and now abandoned.

Insoluble polymers containing metal chelate groups have been described previously (see, for example, U.S. Patents 2,620,325, 2,634,253, and 2,647,106). These polymers are crosslinked through the chelate rings formed by the union of the multiplicity of chelate-forming groups present in the polymer with polyvalent metal atoms. While such polymers have the great advantage of being resistant to heat and solvents, their technical value is severely limited by the fact that it is not possible to form them into useful articles, e.g., films, sheets, filaments, objects and the like, prior to insolubilization through chelate crosslinking.

This invention has as an object a method of preparing compositions which can be readily converted to crosslinked, insoluble, and infusible polymers. A further object comprises such crosslinkable compositions. A still further object comprises such compositions which are stable, that is, capable of being stored and handled without gelation or other deterioration. Another object is the preparation of stable compositions, including solutions, from which shaped polymer articles can readily be formed, which articles, upon air-drying or moderate baking become tack-free rapidly and are then hard, tough and resistant to light, oxygen, water, acids, alkalies, and the common organic solvents. Still another object is the preparation of chelate complexes. Still another object is the provision of esters suitable for polychelation. Other objects will appear hereinafter.

These objects are accomplished by the present invention of compositions having as their essential ingredients, (a) An organic compound which is a polyligand, i.e., has in its molecule a plurality, $m$, of chelating structures, i.e., structures which with a polyvalent metal form a chelate ring, and (b) A chelate, with a volatile chelating agent, of a polyvalent metal of absolute valence $n$, $m$ and $n$ being plural integers and totaling at least five.

The polyligands suitable for the purpose of this invention are esters having a plurality, $m$, of hydroxyl groups esterified with a $\beta$-ketomonocarboxylic acid having hydrogen on the $\alpha$-carbon atom, the alcohol portion of said esters being taken from the class consisting of (1) polyhydric alcohols, and (2) free hydroxyl group-containing polyhydric alcohol esters of carboxylic acids.

The invention also includes a process of preparing crosslinked organic polymers, said polymers being insoluble in non-chelating solvents and containing metal atoms bonded to the polymer molecules as members of chelate rings, which comprises forming an intimate mixture of (1) an organic compound having $m$ chelating structures per molecule, said compound being a polyhydric alcohol $\beta$-ketomonocarboxylate as defined above, and (2) a chelate of a volatile chelating agent with a chelate-forming metal of principal valence $n$, both $m$ and $n$ being at least two and the sum of $m$ and $n$ being at least five; and evaporating the volatile chelating agent and any solvent present, thereby forming a polymer crosslinked through polyvalent metal chelate groups.

The chemistry of chelate compounds has developed to a remarkable degree in recent years. A good summary of it has been given by H. Diehl in an article entitled "The Chelate Rings," Chemical Reviews 21, 39–111 (1937). A more extensive and more recent review of the field is presented in "Chemistry of the Metal Chelate Compounds," by Martell and Calvin (Prentice-Hall, Inc., New York, 1952). See also Gilman's "Organic Chemistry—An Advanced Treatise," John Wiley and Sons, vol. II, the chapter entitled "Modern Electronic Concepts of Valence," by J. R. Johnson, particularly at pages 1868–1883.

A chelating, or chelate-forming, structure is one which contains at least two donor groups so located with respect to one another that they are capable of forming a chelate ring with a metal, the chelate ring being normally of five or six members. The donor groups are well known and recognized in chelate chemistry, the principal ones being listed by Diehl (loc. cit., p. 43) and by Martell and Calvin (loc. cit., p. 168). The most important donor groups, and consequently the chelate-forming structures therefrom, are those which contain oxygen, sulfur, or nitrogen as the donor atoms.

Organic compounds containing chelating structures are called "ligands" in the language of chelate chemistry. For the purpose of this invention it is necessary to use organic compounds having at least two ligand functions (i.e., two chelating structures) and therefore these compounds are often referred to herein as "polyligands." Simple examples of polyligands are monomers or polymers containing a plurality of $\beta$-ketoester groups, as defined above. Many examples of such polyligands will be given in the description which follows.

The second component of the crosslinkabe compositions of this invention is a chelate of a volatile chelating agent with a polyvalent chelate-forming metal. By "volatile chelating agent" is meant here an organic compound containing at least one (and generally only one) chelate-forming structure, which compound boils below 300° C. at 760 mm. pressure. A number of such volatile chelating agents are known, such as acetylacetone or ethyl acetoacetate. The chelate-forming metals form a well-defined class. They are identified in the table on p. 182 of the Martell and Calvin book already referred to. For the purpose of this invention, it is necessary that the chelate-forming metal be polyvalent, i.e., be in a plural valence state.

The relative proportions of the two active components in the mixtures of this invention, that is, of the polyvalent metal chelate of a volatile chelating agent with respect to the polyligand, are not critical. However, it is desirable that there be enough of the metal chelate present to react with at least 10%, and preferably at least 25% of the chelating structures of the polyligand. In most cases, the two components are used in approximately equivalent ratio, that is, there is used enough of the metal chelate to react with approximately all of the chelating structures of the polyligand. An excess of the metal chelate can be used if desired, e.g., up to three times the calculated amount or even more.

In some cases, the components of the crosslinkable compositions of this invention are liquid and compatible with one another, and the resulting composition is a homogeneous solution. More often, the components are compatible but it is recommended or necessary to use sufficient of a mutual solvent if a homogeneous composition fluid at room temperature is desired. For this purpose, any inert, volatile solvent can be used. Preferably, the solution is as concentrated as possible, consistent with a practical viscosity. In still other cases, the compositions are not homogeneous at room temperature, and even at elevated temperatures, e.g., up to about 100° C. This is the case particularly when the polyligand is a polymer which is a solid of limited solubility in the usual solvents at room temperature. Whether or not the compositions of this invention are homogeneous and/or fluid at room temperature is largely immaterial for the purpose of preparing shaped objects, although compositions which are fluid solutions at room temperature are generally preferred because of their greater ease of handling.

What takes place in the mixtures when the volatile chelating agent is evaporated is a ligand exchange which is also termed chelate interchange or transchelation, paralleling the widely used terms ester interchange, amide interchange, transesterification, transamination, etc. The process is an exchange, or transfer, of the metal from the chelating structures of the volatile chelating agent to those of the non-volatile polyligand. To illustrate, the transchelation between the ethyl acetoacetate chelate of a divalent metal and a polyligand having acetoacetoxy groups, the latter being chelate-forming, may be represented by the following equation, where Me represents the metal, Pol. represents the polyligand molecule to which the chelate-forming structures are attached, and the ring arrows represent the coordinate bonds:

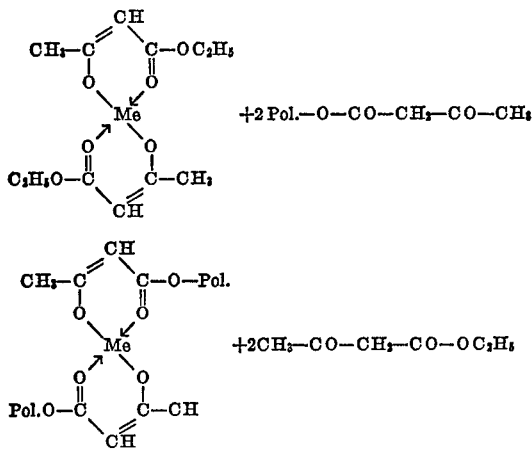

Thus, when both the number $m$ of chelate-forming structures per polyligand molecule and the principal valence $n$ of the metal are at least two and the sum of $m$ and $n$ is at least five, a chelated polymer is formed and crosslinking through the chelate rings takes place between the polymer molecules. The formation of chelate crosslinkages, that is, of a space network of chelate linkages, derives from the involvement in the reaction of two polyfunctional reactants, of which at least one is more than bifunctional.

In the transchelation process of the present invention, evaporation of the solvent, if any is present, and of the volatile chelating agent by air-drying or, if desired, moderate baking, leaves a polymer crosslinked through the chelate rings. This polymer contains the metal which was present in the chelate of the volatile chelating agent. The polymer is infusible, and insoluble in the common organic solvents. The only solvents which effect it are those having a strong chelating action, since they tend to reverse the equilibrium and to form, partly or completely, a soluble chelate of the metal present in the chelate rings of the polymer.

The outstanding advantage of this transchelation process is that the non-volatile polyligand and the polyvalent metal chelate of a volatile chelating agent can be combined in intimate mixtures, such as homogeneous solutions, without precipitation of the crosslinked, chelated polymer. Thus, these intimate mixtures can be formed, stored and handled at will, and it is only on removal of the volatile materials by evaporation that formation of the crosslinked polymer takes place. This is because an equilibrium between ligands and metal exists in the compositions, which is shifted, with formation of the chelate crosslinked polymer, only when the volatile ligand is removed.

When, as is normally the case, a shaped structure of the chelate crosslinked polymer is desired, the shaping is done essentially concurrently with the removal of the volatile chelating agent, e.g., by casting, extruding or pressing objects such as films, sheets, filaments, molded structures and the like, and completing the evaporation of the volatile materials as needed. In cases where the chelated composition is moldable at high temperatures, shaping may be accomplished subsequently to chelation.

As already mentioned, the intimate mixture of the polymeric polyligand and metal chelate of a volatile chelating agent need not be a homogeneous solution at room temperature. It is only necessary that its components form a homogeneous system at the temperature at which the shaped object is being formed. It is often desirable to add to the mixture a small additional amount of a volatile chelating agent, e.g., acetylacetone, as insurance against premature gelation of the chelate crosslinked polymer.

The invention is illustrated in greater details in the examples which follow, in which parts are by weight unless otherwise specified. In these examples the viscosity measurements were made at room temperature, this being about 25° C.

EXAMPLE I

A polyallyl acetoacetate having a degree of polymerization of 8–10 (such polymers can be made by ester interchange by the first method of Example II, below, of a low molecular weight polyallyl alcohol, e.g., that of U.S. 2,431,224, with ethyl acetoacetate, or by direct polymerization of monomeric allyl acetoacetate) was mixed with equivalent amounts of various metal chelates of volatile chelating agents, as shown in the table below. A small amount of solvent was added in each case, in order to give solutions having viscosities suitable for the preparation of coatings. The solutions so prepared were clear and stable towards gelation. Films 1–2 mils thick cast from these solutions were rapidly converted to insoluble, clear, hard coatings upon air-drying or baking at 120° C. for 30 minutes.

*Solutions of polyligand and metal chelates*

| Metal Chelate | Parts/100 Parts Polymer | Solvent |
| --- | --- | --- |
| A. Bis(methyl salicylato)beryllium | 110 | Toluene/ethanol. |
| B. Tris(methyl salicylato)aluminum | 113 | Toluene/1-butanol. |
| C. Bis(butyl acetoacetato)copper II | 133 | Do. |
| D. Tris(acetylacetono)iron III | 83 | Do. |
| E. Bis(ethyl acetoacetato)beryllium | 94 | Toluene. |
| F. Tris(ethyl acetoacetato)aluminum | 97 | Do. |

It was found advisable to add a small amount of methyl salicylate to solutions A and B above since these solutions had a tendency to gel in the absence of a small excess of volatile chelating agent.

The stability of these solutions may be illustrated by the behavior of a typical one, very similar to E above. This solution, consisting of 5 parts of polyallyl acetoacetate, 4.7 parts of bis(ethyl acetoacetato)beryllium and 1.9 parts of toluene, had a viscosity of 2.38 poises when freshly prepared. Upon standing at room temperature, the viscosity increased somewhat at first and then remained unchanged. For example, after two days the viscosity of this solution had increased to 12.9 poises, but then remained constant on further storage.

EXAMPLE II

Five hundred parts of a castor oil modified polyglyceryl phthalate resin containing, by weight, 55% castor oil, 41.9% polyglyceryl phthalate and 3.1% glycerol, having an acid number of 6.5, a hydroxyl number of 151, and a viscosity in 65% xylene solution at 25° C. of 13 poises, was heated with 300 parts of ethyl acetoacetate and 500 parts of toluene. In three hours heating there was collected 80 parts by volume of the toluene/ethanol binary distilling at 77° C. Removal of an additional 200 parts by volume of toluene left a solution, having a viscosity of 0.14 poise at 40% solids, of the polyacetoacetate of the polyester resin. This product will be referred to in the remainder of this example as the polyligand for the sake of brevity.

Another method of preparing this polyligand consists in using diketene to introduce acetoacetate groups. Six hundred and fifteen parts of the above-described 65% xylene solution of the castor oil modified polyglyceryl phthalate resin was diluted with 385 parts of toluene. To the mixture was added 2 parts of p-toluenesulfonic acid, then 100 parts of diketene was added at a temperature of 65° C. in two hours and the unchanged diketene was destroyed by addition of absolute alcohol.

The 40% toluene solution of the polyacetoacetate of the polyester resin, described above, or similar toluene solutions of different concentrations, were used as follows:

A. A solution of 5.5 parts of tris(ethyl acetoacetato)aluminum in 4 parts of n-butyl alcohol and 2 parts of ethyl acetoacetate was mixed with 50 parts of the 40% solution of the polyligand described above. The clear solution obtained had a solids content of 34% and a viscosity of 0.36 poise. The viscosity remained unchanged upon storage at room temperature. Films cast from this solution, to give dry films 1–2 mils thick, became tack-free in two hours at room temperature and after drying overnight were hard, tough, flexible, insoluble, and resistant to water, aqueous alkali and acid. Similar film properties were shown by coatings baked for 30 minutes at 400° F. These films were only slightly discolored on baking. This is in contrast to coatings prepared from the polyligand containing no metal chelate, which did not dry even after prolonged periods at room temperature and remained soft and sticky even after baking at elevated temperatures.

The effect on the final film properties of variations in the polyligand/metal chelate ratio is illustrated in the following table, summarizing experiments in which tris(ethyl acetoacetato)aluminum was combined with the polyligand solution to give an aluminum content in the final film varying from 10% to 300% of the amount required to chelate with all the acetoacetoxy groups of the polyligand. Films on bonderized steel were baked for 30 minutes at 150° C. The coatings were all colorless and glossy.

| Percent Aluminum | Pencil Hardness | Adhesion | Toughness | Mar Resistance | Resistance to Toluene |
|---|---|---|---|---|---|
| 10 | B | Poor | Excellent | Poor | Fair.[1] |
| 25 | HB | Good | do | Fair | Excellent. |
| 50 | H | do | do | Good | Do. |
| 100 | H | Good+ | do | do | Good+. |
| 200 | H | Excellent | Good | Excellent | Do. |
| 300 | H | Good | Fair | do | Do. |

[1] Useful as a masking film.

B. When the above solution of tris(ethyl acetoacetato)aluminum was replaced by a solution of 5.65 parts of bis(ethyl acetoacetato)magnesium in a mixture of 12 parts of n-butyl alcohol and 1 part of ethyl acetoacetate, there was obtained a coating composition containing 25% solids and having a viscosity of 0.32 poise, which viscosity remained constant upon storage at room temperature. Hard, flexible, inert coatings were obtained from this mixture upon air-drying or baking.

C. A mixture of 13.4 parts of bis(salicylaldehydo)nickel II, 100 parts of a 44.7% solids solution, as described above, of the polyligand and 49 parts of β-methoxyethanol gave a stagle, clear solution. Films upon air-drying or baking were clear, hard, pale green, tough and inert. Similar results were observed and dark green films were obtained when the nickel/salicylaldehyde chelate was replaced with 13.7 parts of bis(salicylaldehydo)copper II.

D. Tetrakis(acetylacetono)zirconium (12.3 parts) was dissolved in 100 parts of a 51% solution, as described above, of the polyligand to give stable solutions. Films cast therefrom could be air-dried or baked to clear, colorless, inert coatings.

E. Diisopropyl bis(ethyl acetoacetato)titanate was prepared by adding 51 parts of ethyl acetoacetate to 27.8 parts of tetraisopropyl titanate. Addition of 196 parts of a 51% solution of the polyligand gave a clear, yellow, stable solution which upon air-drying or baking in thin films yielded clear, inert, insoluble coatings of excellent hardness and toughness.

F. One hundred twenty-seven parts of a 51% solution of the polyligand, 20.8 parts of bis(ethyl acetoacetato)zinc and 15 parts of ethyl acetoacetate gave a similar stable, film-forming solution.

G. One hundred forty-one parts of a 51% solution of the polyligand, 18.2 parts of bis(acetylacetono)manganese II and 8 parts of n-butyl alcohol gave a stable, film-forming solution. Similar stable, film-forming solutions were obtained using the aluminum chelates of 3-methyl-, 3-ethyl-, and 3-allyl-2,4-pentanedione, the copper chelate of ethyl(trifluoroaceto)acetate, bis(acetylacetono)zinc, bis(ethyl acetoacetato)cobalt II, bis(ethyl acetoacetato)copper II, bis (acetylacetono)magnesium, bis(butyl acetoacetato)copper II, tris(acetylacetono)aluminum, tris(methyl salicylato)aluminum, bis(methyl salicylato)beryllium, and tris(ethyl acetoacetato)iron III.

EXAMPLE III

The procedure of Example II was repeated with a coconut oil modified polyglyceryl phthalate having the following properties. Composition: 29.7% coconut oil, 60.5% polyglyceryl phthalate, 5.2% triacetin, 4.6% glycerol; acid number 9.1, hydroxyl number 124. The reaction mixture, which was a solution of the acetoacetate of this polyester resin in ethyl acetoacetate and toluene, had a viscosity of 0.18 poise at 36.4% solids. Twenty-five parts of this solution was treated with a solution of 2.54 parts of bis-ethyl acetoacetato)magnesium in 2.4 parts of n-butyl alcohol and 1.7 parts of toluene. There resulted a clear, stable solution. Thin films of this solution deposited on steel became insoluble on air-drying or baking to give hard, mar-resistant coatings.

EXAMPLE IV

The ester interchange procedure of Example II was applied to a coconut oil acid modified polypentaerythrityl phthalate having the following properties. Composition: 42.2% polypentaerythrityl phthalate, 48.1% pentaerythritol ester of coconut oil fatty acids and 8.9% pentaerythritol; acid number 13.3, hydroxyl number 173, viscosity of 1.13 poises at 49.5% solids in toluene. The resulting acetoacetate of this polyester resin had a viscosity of 0.40 poise at 56.1% solids in a mixture of toluene and ethyl acetoacetate. Into 100 parts of this solution was dissolved 18.8 parts of tris(ethyl acetoacetato)aluminum to give a clear, stable solution. Thin films of this solution became insoluble and hard on air-drying or baking.

EXAMPLE V

The ester interchange procedure of Example II was applied to a hydrogenated castor oil modified polyglyceryl phthalate having the following properties. Composition: 55% hydrogenated castor oil, 41.9% polyglyceryl phthalate, 3.1% glycerol; acid number 4.1, viscosity 2.0 poises at 55% solids in toluene. The resulting polyester acetoacetate had a viscosity of 1.19 poises at 55.7% solids in a mixture of toluene and ethyl acetoacetate. This solution, diluted with 10% by volume of ethyl acetoacetate, was mixed with 27.6% by weight (based on the resin solids) of tris(ethyl acetoacetato)aluminum, which on stirring and warming dissolved rapidly to give a clear, stable solution. Films of this solution, after air-drying overnight or baking for 30 minutes at 95° C., were insoluble, hard, tough and mar-resistant.

EXAMPLE VI

The castor oil modified polyglycerol phthalate used in Example II was reacted, using the ester interchange procedure described in Example II, with 1.5 equivalents (based on the hydroxyl content of the polyester) of ethyl trifluoroacetoacetate. Removal of the toluene/ethanol binary followed by removal of some toluene left a solution of the trifluoroacetoacetate of the polyester resin having a viscosity of 0.005 poise at 30% solids. Three parts of this solution was mixed with a toluene solution of 0.49 part of tris(3-methyl-2,4-pepntanediono)-aluminum. This solution gelled, but became clear again and completely stable upon addition of a very small amount of 3-methyl-2,4-pentanedione. Films of this solution deposited on steel panels and baked at 95° C. for 30 minutes gave clear, hard, flexible coatings unaffected by immersion in boiling water for one hour. Similar results were obtained with tris(acetylacetono)aluminum.

EXAMPLE VII

The castor oil modified polyglycerol phthalate of Example II was treated with 1.2 equivalents of ethyl benzoylacetate by the ester interchange procedure of Example II. There was obtained a toluene solution of the benzoylacetate of the polyester resin which was concentrated to 40% solids content. Three and one-half parts of this solution was treated with a toluene solution of 0.41 part of tris(ethyl acetoacetato)aluminum. The resulting clear solution, when deposited on steel panels and baked at 95° C. for 30 minutes, gave clear, hard, flexible films which were unchanged when immersed in boiling water for 30 minutes. Similar results were obtained using tris(acetylacetono)aluminum and baking the films at 150° C. for 30 minutes.

EXAMPLE VIII

A mixture of 200 parts of castor oil, 200 parts of toluene and 120 parts of ethyl acetoacetate (an excess over the quantity calculated to react with the ricinoleic acid hydroxyl groups) was distilled slowly. There was collected 32 parts of the toluene/ethanol binary mixture boiling at 77° C. Evaporation of the remaining solvent and excess ethyl acetoacetate left 254 parts of a liquid residue having a viscosity of 2.94 poises. This consisted chiefly of the tris-acetoacetate of glycerol tris-ricinoleate.

To 100 parts of the above material and 69 parts of tris(ethyl acetoacetato)aluminum to give a clear, viscous fluid which did not gel on aging at room temperature. This composition was filming-forming. Coatings became tack-free in four hours at room temperature. Upon air-drying overnight, the coatings were set to touch, tough, extensible and similar in mechanical properties to air-dried films of natural drying oils.

A pigmented composition was prepared by grinding 9.4 parts of pigment grade titanium dioxide, 14.6 parts of zinc oxide pigment and 18.0 parts of magnesium silicate extender into 30 parts of the tris-acetoacetate of glyceryl tris-ricinoleate. Two parts of ethyl acetoacetate was added as solvent to assist in the dispersion of the pigment. To the pigmented composition was added 11 parts of tris(ethyl acetoacetato)aluminum. The final composition, after thinning slightly with toluene, could be brushed readily on wood or other surfaces to give a coating which dried overnight at room temperature and compared favorably in properties with commercial exterior paints made from linseed oil.

EXAMPLE IX

From a mixture of 62.5 parts of pentaerythritol, 240 parts of ethyl acetoacetate and 160 parts of dioxane was distilled 100 parts of ethanol. Evaporation of all volatile materials left 176 parts of pentaerythrityl tetraacetoacetate as a clear oil having a viscosity of 2.63 poises. This oil was compatible with an equal weight of tris(ethyl acetoacetato)aluminum to give a viscous mixture which did not gel upon storage at room temperature. Thin films cast therefrom and air-dried became tack-free in 90 minutes to give hard, glossy, colorless coatings. After drying 18 hours, the films were somewhat brittle and resembled thin films of rosin in mechanical properties.

EXAMPLE X

One part of the castor oil acetoacetate used in Example VIII, 0.65 part of the pentaerythrityl tetraacetoacetate of Example IX and 0.96 part of tris(ethyl acetoacetato)aluminum gave a clear, compatible, stable mixture which, in thin films, became tack-free in six hours at room temperature. After standing overnight, the films were hard, glossy, insoluble in non-cheleating organic solvents and inert to dilute aqueous acids and alkalies and had the hardness and toughness of a conventional varnish.

EXAMPLE XI

The monoglyceride of castor oil was prepared by heating under nitrogen a mixture of 800 parts of castor oil, 160 parts of glycerol and 0.5 part of litharge to a temperature of 200° C. for one hour. The mixture was cooled to 100° C., 1040 parts of ethyl acetoacetate and 910 parts of toluene were added and 780 volumes of toluene/ethanol binary boiling at 77° C. were removed by distillation. Evaporation of the solvent and excess ethyl acetoacetate left a liquid residue of 1520 parts having a viscosity of 1.83 poises. This product consisted chiefly of the mixed glyceryl ester of acetoacetic acid and of 12-acetoacetoxyoleic acid.

A mixture of 100 parts of this material and 69 parts of tris(ethyl acetoacetato)aluminum gave a stable, clear, viscous liquid having a viscosity of 12.5 poises. Thin films cast from this mixture, air-dried or baked at elevated temperatures, gave hard, mar-resistant, glossy films which were tough, insoluble in non-chelating solvents and inert to dilute acids and alkalies.

EXAMPLE XII

The castor oil-modified polyglyceryl phthalate of Example II was reacted, using the ester interchange procedure of that example, with 1.0 equivalent (based on the hydroxyl content of the polyester) of 2-carbethoxycyclopentanone,

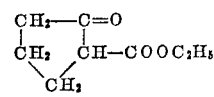

Removal of the toluene/ethanol binary followed by removal of some toluene left a solution of the cyclopentanonecarboxylate of the polyester having a viscosity of 0.54 poise at 48% solids. Ten parts of this solution mixed with 1.4 parts of tris(ethyl acetoacetato)aluminum dissolved in toluene gave a composition which gelled rapidly but could be stabilized by addition of a small amount of ethyl acetoacetate. Films from this solution deposited on steel panels and baked at 150° C. for 30 minutes gave clear, hard, flexible coatings.

EXAMPLE XIII

An oil-free, hydroxyl containing alkyd resin of acid number 10 and hydroxyl number 106 was prepared by reacting one mole each of glycerin and decamethylene glycol with two moles of phthalic anhydride at 150–200° C. for 15 hours. The α-acetylacetoacetate of this polyester was prepared by the ester interchange procedure of Example II with 1.0 equivalent (based on the hydroxyl content of the polyester) of ethyl α-acetylacetoacetate

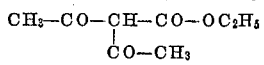

Removal of the toluene/ethanol binary followed by concentration gave a solution having a viscosity of 0.27 poise at 48% solids. Fifteen parts of this solution mixed with 1.1 parts of tris(acetylacetono)aluminum gave a composition which gelled on warming but could be stabilized by addition of a small amount of acetylacetone. Films from this solution cast on steel plates and baked at 150° C. for 30 minutes gave colorless, hard coatings having excellent impact flexibility.

EXAMPLE XIV p-Vinylbenzyl acetoacetate,

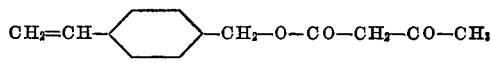

B.P. 125–131° C. at 0.2 mm. pressure, was prepared by ester exchange in refluxing toluene between ethyl acetoacetate and p-vinylbenzyl alcohol in the presence of hydroquinone.

A methyl acrylate/p-vinylbenzyl acetoacetate copolymer was prepared by refluxing for six hours a mixture of 45 parts of p-vinylbenzyl acetoacetate, 160 parts of methyl acrylate, 750 parts of benzene and 2 parts of azobis(isobutyronitrile). Upon precipitation with methanol there was obtained an 80% yield of the copolymer, having a viscosity of 2.75 poises at 47.7% solids in methyl isobutyl ketone. This copolymer contained 79% methyl acrylate as determined by carbon and hydrogen analysis.

Seventeen parts of the 47.7% copolymer solution in methyl isobutyl ketone, when mixed with 1.4 parts of tris(ethyl acetoacetato)aluminum, gave a composition which gelled on standing but could be stabilized against gelation by addition of 2 to 3 parts of ethyl acetoacetate. Films from this solution deposited on steel panels and baked at 150° C. for 30 minutes gave hard, colorless coatings having very good solvent resistance.

Similar results were obtained using, as the polyligand, a 77/23 (by weight) copolymer of methyl methacrylate and p-vinylbenzyl acetoacetate.

EXAMPLE XV 2-cyanoallyl acetoacetate,

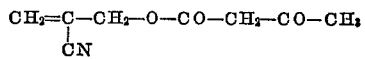

B.P. 116–117° C. at 1.5 mm. pressure, was prepared by ester exchange in refluxing toluene between 2-cyanoallyl alcohol and excess ethyl acetoacetate in the presence of hydroquinone.

A methyl acrylate/2-cyanoallyl acetoacetate copolymer was prepared in 88% yield by heating for six hours at 75° C. a mixture of 5 parts of 2-cyanoallyl acetoacetate, 20 parts of methyl acrylate, 35 parts of benzene and 0.25 parts of azobis(isobutyronitrile). The copolymer, precipitated with methanol, contained 2.13% nitrogen, corresponding to 21.8% by weight of 2-cyanoallyl acetoacetate. Films cast from a toluene solution of this copolymer containing an equivalent (⅓ mole per chelating group of the polyligand) amount of tris-ethyl aceto- acetato)aluminum gave, on baking at 150° C. for 30 minutes, hard, flexible, insoluble coatings.

EXAMPLE XVI

A solution of 70.3 parts of hexamethylene glycol and 120 parts of diethyl acetonedicarboxylate in toluene was slowly distilled until about 75 parts of ethanol/toluene binary, boiling at 78° C., had been collected. This ester exchange reaction served to form polyhexamethylene acetonedicarboxylate,

The residue in the still was then concentrated to a solids content of 69%, this solution having a viscosity of 5.89 poises. When this solution of polyligand was mixed with tris(ethyl acetoacetato)aluminum in an amount sufficient to give 65% by weight of the latter, based on polymer solids, and with 60 parts of ethyl acetacetate, a stable solution was obtained which gave films that became hard and insoluble on air-drying or baking. Similar results were obtained when the hexamethylene glycol was replaced by an equivalent weight of bis(2-hydroxyethyl)-terephthalate or bis(6-hydroxyhexyl)-adipate.

EXAMPLE XVII

A copolymer of vinyl acetate and allyl acetoacetate was prepared by heating a mixture of 19.2 parts of vinyl acetate, 14.2 parts of allyl acetoacetate, 1.03 parts of azobis(isobutyronitrile) and 34.4 parts of benzene for 19 hours at 75° C. in a nitrogen atmosphere. The resulting solution had a viscosity of 0.6 poise and a solids content of 45.7%, indicating a conversion to polymer of 94.3%. The copolymer had a vinyl acetate/allyl acetoacetate molar ratio of about 2.5/1.

Upon addition of 0.36 part of tris(ethyl acetoacetato)-aluminum to 3 parts of this polymer solution, a clear solution was obtained, from which films were cast on phosphated steel and baked for 30 minutes at 150° C. to give very hard coatings insoluble in toluene.

EXAMPLE XVIII

Copolymers of vinyl chloride with three polymerizable materials having chelating structures, viz., allyl acetoacetate, methallyl acetoacetate, and allyl benzoylacetate, were prepared as follows: Glass pressure bottles were charged with 3 parts of azobis(isobutyronitrile), 150 parts of benzene, 15 parts of tert.-butyl alcohol, and monomers in the amounts shown in the following table. The bottles were flushed with nitrogen, capped, and agitated at 60° C. for 19 hours. The contents were then poured into methanol, the polymer which separated was washed with methanol and then dried in a vacuum over under nitrogen. Polymer yields, solution viscosities (poises/percent solids in methyl isobutyl ketone), percent chlorine by analysis, and percent vinyl chloride by weight are shown in the table below.

TABLE

| | a | b | c | d | e | f |
|---|---|---|---|---|---|---|
| Vinyl chloride | 90 | 90 | 60 | 40 | 80 | 80 |
| Allyl acetoacetate | 10 | 20 | 40 | 60 | | |
| Methallyl acetoacetate | | | | | 20 | |
| Allyl benzoylacetate | | | | | | 20 |
| Copolymer, parts | 91 | 88 | 52 | 38.6 | 80 | 68 |
| Viscosity | 0.2/20 | 0.3/20 | 0.7/33 | 0.7/50 | 1.33/33 | 4.8/33 |
| Percent Chlorine | 52.8 | 49.5 | 40.2 | 30.5 | 47.0 | 46.5 |
| Weight percent vinyl chloride | 92.6 | 87.0 | 70.4 | 53.5 | 82.3 | 81.5 |

Solutions of these copolymers, after treatment with an equivalent weight of tris(ethyl acetoacetato)aluminum, gave films which became insoluble upon air-drying or baking. Films cast from the same solutions to which no aluminum chelate had been added remained soluble upon air-drying or baking.

EXAMPLE XIX

A polymer containing a number of acetoacetate groups was prepared as follows: Partial hydrolysis of an ethylene/vinyl acetate copolymer (25 mole percent vinyl acetate) was effected by adding a solution of 4 parts of potassium hydroxide in 160 parts of isopropyl alcohol to 67.2 parts of the copolymer in 430 parts of toluene. After heating the mixture at reflux for two hours the resulting solution was steamed to separate the hydrolyzed polymer, which had a saponification equivalent of 202, indicating 22% hydrolysis. Fifty parts of this hydrolyzed copolymer was esterified by heating with 10 parts of ethyl acetoacetate in toluene, removing the ethanol formed as a toluene azeotrope. The theoretical quantity of ethanol was removed during 20 hours at reflux, and the resulting solution was concentrated to 224 parts to increase its viscosity for casting purposes.

An aliquot portion of the above polyligand solution was combined with one equivalent of tris(ethyl acetoacetato)aluminum and a small amount of ethyl acetoacetate, and cast on a glass plate. After warming the film slowly to 125° C., removing volatile materials under reduced pressure, and stripping the film from the plate there was obtained a clear self-supporting film with slight surface tackiness. This film had a tensile strength of 3880 lbs./sq. in., a break elongation of 560% and an initial modulus of 515. When held at 50% elongation for one minute, it retracted essentially completely when released, indicating considerable resilience (88% work recovery). In comparison, the initial unchelated polymer is a tacky gum having no elastic properties.

Similarly resilient thin sheets were prepared by substituting copper and zinc chelates for the aluminum chelate of this example, or by substituting the benzoyl acetoacetic ester of a hydrolyzed ethylene/vinyl acetate copolymer for the acetoacetic ester.

EXAMPLE XX

A mixture of 4.68 parts of cellulose acetate (49% combined acetic acid), 65 parts of ethyl acetoacetate and 5 parts of toluene was heated to reflux for 22 hours, removing the ethanol as it formed. The residue was concentrated to 55 parts to give a solution of good casting viscosity containing the cellulose acetate/acetoacetate.

An aliquot portion of this polyligand solution was mixed with one equivalent (calculated on the acetoacetate groups) of tris(ethyl acetoacetato)aluminum and cast on a glass plate. The solvent was removed by warming to 125° C. and the volatile chelating agent was removed under reduced pressure. On stripping the film from the plate there was obtained a clear, stiff self-supporting film, which did not melt at 300° C.

EXAMPLE XXI

A copolymer of vinyl acetate (9% by weight) and vinyl chloride (91% by weight) was partially hydrolyzed to a product containing, in addition to the vinyl chloride, 2.3% by weight of hydroxyl groups and 3% by weight of vinyl acetate. A polymeric polyligand was prepared from this copolymer by heating it with ethyl acetoacetate in a cyclohexanone/toluene mixture and removing the ethanol as it formed. After 23 hours' refluxing the residue was concentrated to casting viscosity, mixed with an equivalent quantity of tris(ethyl acetoacetato)aluminum and cast on a glass plate. After removal of the solvent, the monomeric ligand was removed under reduced pressure at 100° C. and the film was removed from the plate, producing a clear, stiff sheet insoluble in a cyclohexanone/toluene mixture and retaining its strength up to about 250° C., whereas an otherwise similar but unchelated control lost its strength at 75° C.

Specific additional examples of polyligands as already defined includes ethyleneglycoldibenzoyl acetate, glycerol triacetoacetate, the β-ketoacylates of hydroxyacid esters of polyhydric alcohols, etc. Another type of polyligand comprises polymer materials of high molecular weight (addition or condensation polymers) having at least two, but generally a larger number, of chelating structures. These include, for example, the esters of hydroxyl-containing polymers such as polyvinyl alcohol, hydrolyzed ethylene/vinyl acetate polymers, cellulose, cellulose esters, cellulose ethers, polyester resins having free hydroxyl groups and the like with acyclic or or cyclic β-ketoacids such as acetoacetic acids or 2-carboxycyclopentanone or β-diketoacids such as α-benzoylacetoacetic acid, α-acetylacetoacetic acid or 4-carboxy-5,5-dimethylcyclohexane-1,3-dione; the polymers and copolymers of β-ketoesters of p-vinylbenzyl alcohol or 2-cyanoallyl alcohol; polyester resins from glycols such as hexamethylene glycol or decamethylene glycol and chelate-forming dicarboxylic acids such as acetone dicarboxylic acid; and the like.

Two types of polyligands are of particular utility. One of these is that of the β-ketoacylates of hydroxymonocarboxylic acid esters of monomeric and polymeric polyhydric alcohols.

In the examples above this phase of the invention has been illustrated in connection with the acetoacetates of partial or complete ricinoleic acid esters of glycerol. However, this phase of the invention includes broadly the esters, with any β-ketomonocarboxylic acid having at least one hydrogen atom attached to the carbon atom between the keto and carboxyl groups, of any partial or complete ester of a polyhydric alcohol with an aliphatic hydroxymonocarboxylic acid. Thus, the new products of this invention include, for example, the acetoacetates, trichloroacetoacetates, trifluoroacetoacetates, propionacetates, butyroacetates, caproacetates, α-acetopropionates, γ-ethoxyacetoacetates, α-acetophenylacetates, benzoylacetates, 2-furoylacetates, 2-thenoylacetates, α-benzoylpropionates, α-benzoyl acetoacetates, and α-acetylacetoacetates of the partial or complete hydroxyacetates of ethylene glycol, dodecamethylene glycol, cellulose, hydrolyzed ethylene/vinyl acetate copolymers, polyallyl alcohol, etc.; β-hydroxypropionates of propylene glycol, glycerol, etc.; lactates of hexamethylene glycol, mannitol, polyvinyl alcohol, etc.; α-hydroxybutyrates of pentaerythritol, sorbitol, etc.; 10-hydroxystearates of erythritol, glycerol, etc.; 9-hydroxystearates of ethylene glycol, glycerol, etc.; glycerate of ethylene glycol; 9,10-dihydroxystearate of glycerol; α-hydroxyvinyl acetate of ethylene glycol; and the like.

As already stated, there should be at least two β-ketomonoacyloxy groups present in each molecule of the esters of this type. These groups have the general formula $R_1-CO-CHR_2-CO-O-$, wherein $R_1$ is an organic radical stable under the reaction conditions. For reasons of availability of the compounds, $R_1$ is preferably a hydrocarbon group, but it can also be a hydrocarbon group containing essentially unreactive substituents such as non-labile halogen, preferably chlorine or fluorine, acyclic or cyclic ether oxygen or thioether sulfur, or the like. Still more preferably, $R_1$ is a hydrocarbon group of one to six carbon atoms free from aliphatic unsaturation. The radical $R_2$ is preferably hydrogen but can be a hydrocarbon group, preferably of one to six carbon atoms and free from aliphatic unsaturation. Since the principal use of the β-ketoacyl hydroxyacid esters is to act as ligands in the subsequent formation of metal chelates, the most available β-ketomonoacyloxy group, i.e., the acetoacetoxy group, is the preferred one.

The preferred aliphatic hydroxyacid esters are those derived from polyhydric alcohols having from 2 to 6 hydroxy groups, these being non-tertiary, i.e., primary or secondary, i.e., attached to hydrogen-bearing carbon, and of from 2 to 6 carbon atoms, and from aliphatic monohydroxymonocarboxylic acids free from functional groups other than the hydroxy and carboxyl groups.

Still more preferably, the monohydroxymonocarboxylic acid is one having from 2 to 18 carbon atoms and having at most one carbon-to-carbon unsaturation, and that ethylenic. The most useful esters are those of glycerol with the above-defined hydroxyacids. Mixtures of hydroxyacid esters, or mixed hydroxyacid esters of a single polyhydric alcohol, can be used.

Another preferred class of polyligands for use in the compositions of this invention is that of polyester resins having free hydroxyl groups further plurally esterified with a β-ketomonocarboxylic acid having at least one hydrogen atom attached to the carbon atom between the carboxyl and keto groups. These new polyligands include, for example, the acetoacetates, trichloroacetoacetates, trifluoroacetoacetates, propionoacetates, butyroacetates, caproacetates, α-acetopropionates, γ-ethoxyacetoacetates, α-acetophenylacetates, benzoylacetates, 2-furoylacetates, 2-thenoylacetates, α-benzoylpropionates, α-benzoylacetoacetates, and α-acetylacetoacetates of organic solvent-soluble polyester resins, e.g., the condensation products, having free hydroxyl groups, of glycerol and phthalic acid; glycerol and adipic acid; glycerol and tricarballylic acid; sorbitol and sebacic acid; pentaerythritol and succinic acid; ethylene glycol and adipic acid; mannitol and terephthalic acid; polyvinyl alcohol and glutaric acid; polyallyl alcohol and phthalic acid; hydrolyzed ethylene/vinyl acetate copolymers and adipic acid; and the like.

These new polyligands contain, as already indicated at least two β-ketomonoacyloxy groups in each molecule. These groups have the general formula

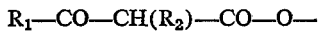

in which $R_1$ is an organic radical stable under the reaction conditions. For reasons of availability, $R_1$ is preferably a hydrocarbon group but it can also be a hydrocarbon group containing essentially unreactive substituents such as non-labile halogen, preferably fluorine or chlorine, acyclic or cyclic ether oxygen or thioether sulfur, or the like. Still more preferably, $R_1$ is a hydrocarbon group of 1 to 6 carbon atoms free from aliphatic unsaturation. The radical $R_2$ is preferably hydrogen but can be a hydrocarbon group, preferably of 1 to 6 carbon atoms and free from aliphatic unsaturation. Since the principal use of the modified polyesters is to act as ligands in the subsequent formation of metal chelates, the most available β-ketomonoacyloxy group, i.e., the acetoacetoxy group is the preferred one.

The preferred polyesters are the condensation products of polyhydric alcohols having from 2 to 6 hydroxy groups, these being non-tertiary, i.e., primary or secondary, and 2 to 6 carbon atoms, and still more preferably such alcohols having at least 3 hydroxyl groups and 3 carbon atoms, with dicarboxylic acids free from aliphatic unsaturation, having no functional groups other than the carboxyl groups, i.e., unsubstituted, and preferably having from 4 to 10 carbon atoms. Specifically preferred are the polyglyceryl phthalates and the polypentaerythrityl phthalates. These polyester resins can be modified with monobasic acid esters of polyhydric alcohols such as castor oil or coconut oil, or with the corresponding monobasic acid themselves such as the drying or non-drying oil fatty acids, e.g., coconut oil acids or linseed oil acids.

In order to attain greater flexibility and toughness in films, fibers, etc., from compositions of the present invention, it is preferred that they contain in substantial quantity carbon chains of at least eight carbons in length. This can be attained by the use of long chain acids, e.g., oil acids, by the use of long carbon chain polyhydric alcohol esters and by the use of long carbon chain polymers, these embodiments being illustrated in many of the examples.

The above examples have furnished numerous illustrations of the second active component of the crosslinkable compositions of this invention, namely, the polyvalent metal chelate of a volatile chelating agent.

The volatile chelating agents employed in the preparation of the polyvalent chelate of the volatile ligand are those most available and most economical, which are the 1,3-diketones, the β-ketoesters and the aromatic o-hydroxy aldehydes and esters. Specifically preferred chelating agents are acetylacetone, 3-methyl-2,4-pentanedione, 3-ethyl-2,4-pentanedione, propionylacetone, trifluoroacetylacetone, 2-furoylacetone, 2-thenoylacetone, ethyl acetoacetate, butyl acetoacetate, salicylaldehyde, methyl salicylate, and the like. The metal chelated with these agents can be any of the large number of polyvalent metals known to form chelates readily (Martell and Calvin, loc. cit., p. 182). Preferred specific examples are aluminum, because its chelates are colorless and readily compatible with most polyligands; cobalt and nickel, because of the particularly good durability of films containing them; zinc, magnesium, zirconium and beryllium, because they form colorless products; and titanium, copper, manganese and iron, where colored products are not objectionable. Still other useful polyvalent metals include chromium, cadmium, boron, tin, scandium, vanadium, and bismuth. Where colored clears containing specular pigments such as mica, pearl essence, or aluminum are desired, the copper, iron, cobalt, nickel, manganese, or titanium chelates may be employed. The chelate-forming metals vary somewhat with respect to the ease with which they undergo chelate exchange, or transchelation. Although most metals undergo chelate exchange rapidly, certain metals, of which chromium III and cobalt III are examples, are more sluggish. Longer periods of air-drying higher baking temperatures or even the addition of traces of strong acids or other chelate exchange catalysts are sometimes desirable when working with the more sluggish metals.

Specific examples of suitable metal chelates of volatile ligands include tris(ethyl acetoacetato)aluminum; bis-(ethyl acetoacetato)zinc; bis(acetylacetono)zinc; bis-(ethyl acetoacetato)cobalt II; bis(ethyl acetoacetato)copper II; bis(salicylaldehydo)copper II; bis(acetylacetono)-magnesium; bis(butyl acetoacetato)copper II; tetrakis-(acetylacetono)zirconium; tris(acetylacetono)aluminum; tris(methyl salicylato)aluminum; bis(methyl salicylato)-beryllium; bis(ethyl acetoacetato)magnesium; diisopropyl bis(ethyl acetoacetato)titanate IV; bis(acetylacetono)-manganese II; tris(ethyl acetoacetato)iron III; tris(acetylacetono)iron III; tris(ethyl benzoylacetato)aluminum; bis(1,1,1-trifluoro-3-benzoylacetono)copper II; tris[(2-furoyl)acetono]aluminum; and the like.

The crosslinkable compositions of this invention vary in appearance, depending upon the nature of the two active constituents, from homogeneous solutions fluid at room temperature to heterogeneous, semi-solid mixtures. In many cases they need not contain any additional solvent, although in general, particularly when the polyligand is polymeric and a fluid solution of convenient viscosity is desired, the use of an additional solvent is recommended. The solvent can be any volatile liquid which is substantially inert towards the two components of the solution. In some cases, water can be used, but in general organic solvents are preferred, for example, aromatic hydrocarbons, e.g., benzene, toluene or xylene, aliphatic alcohols, e.g., methanol, ethanol, n-butanol, ethers, e.g., di-n-butyl ether, dioxane or the like. These organic solvents need not be anhydrous. The examples illustrate a number of suitable solvents. The quantity of the solvent is, of course, not critical. It need only be sufficient to decrease the viscosity of the solution at shaping temperature to a level practical for the forming of articles such as films, filaments, sheets or molded objects.

The compositions of this invention, regardless of whether they are fluid solutions or not, are in general stable towards hardening or loss of plasticity and can be stored for long periods of time. If some tendency to precipitation or gelation is noted on mixing the reactants, such tendency can be overcome by adding a slight excess of the volatile chelating agent to keep the chelated polymer in solution.

One of the most important uses of the compositions of the present invention is in the formation of films, either as coatings on substrates such as metals or as self-supporting films or thin sheets. Film cast from these compositions become tack-free rapidly upon air-drying, and even more rapidly upon baking, for example, at temperatures of 50 to 200° C. for 15 minutes to two hours. These films consist of polymer molecules crosslinked through the chelate rings formed by the polyvalent metal and the chelating structures of the polyligand. The films are hard, tough and inert to long exposures (1200 hours or more) in an apparatus designed to provide an accelerated weathering test. In general, the polyligands alone without the chelate-forming metal are viscous, non-film-forming liquids which cannot be exposed to such a treatment. The chelated films are at least equal to conventional drying oil modified alkyd films in durability. The films are also resistant to water, soap solutions, aqueous acids, aqueous alkalies and the common organic solvents. However, they may be softened or even dissolved by chelating solvents such as acetylacetone or ethyl acetoacetate.

The setting of these chelated polymers does not depend on the action of oxygen on unsaturated linkages, as it does with ordinary drying oils. Accordingly, coatings of these polymers are especially inert toward the oxidative degradation reactions which lead to ultimate failure of air-reactive film formers based on unsaturated oils.

This invention provides a method of forming, handling and storing polymers which are normally intraactable because of their high softening points and of their insolubility in the common solvents. It is entirely unexpected and surprising that metal-containing, crosslinked polymers can be formed and kept as stable compositions, including solutions, which compositions can be converted at any desired time to various useful shaped articles of crosslinked polymer.

The chelated polymers obtainable from the compositions of this invention are outstandingly useful as protective and decorative coatings for metal surfaces, e.g., refrigerators, auto bodies, furniture, and the like, and also for other surfaces such as wood, glass, porcelain or plastics. They are also useful as ingredients of impregnating and coating compositions for natural or synthetic fibers and fabrics. Such coating compositions may contain, if desired, various modifying agents, e.g., pigments, dyes, plasticizers, extenders, and the like.

The chelated polymers are also useful in the form of self-supporting films and thin sheets. Specific uses include wrapping materials for food products, electrical tape, insulating materials for use at relatively high temperatures, flexible materials for use in articles such as bags, hat covers and overshoes. The polymers are further useful in the manufacture by molding or extruding of shaped objects such as tumblers, tableware, chips, tubes, novelty articles, and they can be extruded as filaments, for use for example in making stretchable fabrics in view of their elastic properties. In some cases, articles such as films or filaments made of these chelate crosslinked polymers exhibit valuable elastic properties.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A solution fluid at room temperature, comprising as its essential ingredients, (a) an ester having a plurality, $m$, of hydroxyl groups esterified with a $\beta$-ketomonocarboxylic acid having hydrogen on the $\alpha$-carbon atom, the alcohol portion of said ester being taken from the class consisting of (1) polyhydric alcohols, and (2) free hydroxyl group-containing polyhydric alcohol esters of carboxylic acids, and (b) a polyvalent metal chelate of a volatile chelating agent boiling below 300° C. at 760 mm. pressure and selected from the group consisting of 1,3-diketones, $\beta$-ketoesters, and aromatic o-hydroxyaldehydes and esters, said metal having an absolute valence $n$, both $m$ and $n$ being plural integers and totaling at least 5, the amount of (b) being sufficient to react with at least 10% of the chelating structures of (a).

2. The process of preparing films of organic polymers, insoluble in non-chelating solvents which comprises forming into a film, a solution fluid at room temperature of (a) an ester having a plurality, $m$, of hydroxyl groups esterified with a $\beta$-ketomonocarboxylic acid having hydrogen on the $\alpha$-carbon atom, the alcohol portion of said ester being taken from the class consisting of (1) polyhydric alcohols, and (2) free hydroxyl group-containing polyhydric alcohol esters of carboxylic acids, and (b) a polyvalent metal chelate of a volatile chelating agent boiling below 300° C. at 760 mm. pressure and selected from the group consisting of 1,3-diketones, $\beta$-ketoesters, and aromatic o-hydroxyaldehydes and esters, said metal having an absolute valence $n$, both $m$ and $n$ being plural integers and totaling at least 5, and evaporating the chelating agent boiling below 300° C. and any solvent present from said film.

3. The process of preparing organic polymers insoluble in non-chelating solvents which comprises mixing an ester having a plurality, $m$, of hydroxyl groups esterified with a $\beta$-ketomonocarboxylic acid having hydrogen on the $\alpha$-carbon atom, the alcohol portion of said ester being taken from the class consisting of (1) polyhydric alcohols, and (2) free hydroxyl group-containing polyhydric alcohol esters of carboxylic acids, with a polyvalent metal chelate of a volatile chelating agent boiling below 300° C. at 760 mm. pressure and selected from the group consisting of 1,3-diketones, $\beta$-ketoesters, and aromatic o-hydroxyaldehydes and esters, said metal having an absolute valence $n$, both $m$ and $n$ being plural integers and totaling at least 5, and evaporating the chelating agent boiling below 300° C.

4. The process of preparing films of organic polymers insoluble in non-chelating solvents which comprises forming into a film an intimate mixture of (a) an ester having a plurality, $m$, of hydroxyl groups esterified with a $\beta$-ketomonocarboxylic acid having hydrogen on the $\alpha$-carbon atom, the alcohol portion of said ester being taken from the class consisting of (1) polyhydric alcohols, and (2) free hydroxyl group-containing polyhydric alcohol esters of carboxylic acids, and (b) a polyvalent metal chelate of a volatile chelating agent boiling below 300° C. at 760 mm. pressure and selected from the group consisting of 1,3-diketones, $\beta$-ketoesters, and aromatic o-hydroxyaldehydes and esters, said metal having an absolute valence $n$, both $m$ and $n$ being plural integers and totaling at least 5, and evaporating the chelating agent.

5. A composition comprising in intimate admixture and as its essential ingredients, (a) an ester having a plurality, $m$, of hydroxyl groups esterified with a $\beta$-ketomonocarboxylic acid having hydrogen on the $\alpha$-carbon atom, the alcohol portion of said ester being taken from the class consisting of (1) polyhydric alcohols, and (2) free hydroxyl group-containing polyhydric alcohol esters of carboxylic acids, and (b) a polyvalent metal chelate of a volatile chelating agent boiling below 300° C. at 760 mm. pressure and selected from the group consisting of 1,3-diketones, $\beta$-ketoesters, and aromatic o-hydroxyaldehydes and esters, said metal having an absolute valence $n$, $m$ and $n$ being plural integers and totaling at least 5, the amount of (b) being sufficient to react with at least 10% of the chelating structures of (a).

6. The solution of claim 8 wherein ingredient (b) is a β-ketoester boiling below 300° C. at 760 mm. pressure.

7. The solution of claim 11 wherein ingredient (b) is a 1,3-diketone boiling below 300° C. at 760 mm. pressure.

8. A solution fluid at room temperature containing (a) a polyhydric alcohol ester of a carboxylic acid, said ester having a plurality, $m$, of hydroxyl groups further esterified with a β-ketomonocarboxylic acid having hydrogen on the alpha carbon, and (b) a polyvalent metal chelate of a volatile chelating agent boiling below 300° C. at 760 mm. pressure and selected from the group consisting of 1,3-diketones, β-ketoesters, and aromatic o-hydroxyaldehydes and esters, said metal having an absolute valence $n$, both $m$ and $n$ being plural integers and totalling at least five, the amount of (b) being sufficient to react with at least 10% of the β-ketoacyloxy structures of (a).

9. The solution of claim 8 wherein component (a) is a glyceryl phthalate resin with a plurality, $m$, of hydroxyl groups further esterified with a β-ketomonocarboxylic acid having hydrogen on the alpha carbon.

10. A solution fluid at room temperature containing (a) a polyhydric alcohol ester of a hydroxymonocarboxylic acid, said ester having a plurality, $m$, of hydroxyl groups esterified with a β-ketomonocarboxylic acid having hydrogen on the alpha carbon, and (b) a polyvalent metal chelate of a volatile chelating agent boiling below 300° C. at 760 mm. pressure and selected from the group consisting of 1,3-diketones, β-ketoesters, and aromatic o-hydroxyaldehydes and esters, said metal having an absolute valence $n$, both $m$ and $n$ being plural integers and totalling at least five, the amount of (b) being sufficient to react with at least 10% of the β-ketoacyloxy structures of (a).

11. The solution of claim 10 wherein component (a) is a glyceryl ricinoleate having a plurality, $m$, of hydroxyl groups esterified with a β-ketomonocarboxylic acid having hydrogen on the alpha carbon.

12. A solution fluid at room temperature containing (a) a polyglyceryl phthalate resin with a plurality of hydroxyl groups further esterified with acetoacetic acid, and (b) tris(ethyl acetoacetato) aluminum the amount of (b) being sufficient to react with at least 10% of the acetoacetoxy structures of (a).

13. A polyvalent metal chelate of a polymeric polyhydric alcohol-polycarboxylic acid condensation product modified by further esterification of a plurality, $m$, of hydroxyl groups thereof with a β-ketomonocarboxylic acid having hydrogen on the alpha carbon, the polyvalent metal having an absolute valence $n$, both $m$ and $n$ being plural integers and totalling at least five, said polymer being cross-linked through said polyvalent metal present in six-membered chelate rings formed on different polymer chains, said metal being a common member of said chelate rings, each of said rings having an atom of the polyvalent metal linked to both the carbonylic and carboxylic oxygen atoms of a single β-ketoacyloxy unit.

14. A polymer which is a polyvalent metal chelate of a polyhydric alcohol ester of a hydroxymonocarboxylic acid, which ester has a plurality, $m$, of free hydroxyl groups esterified with a β-ketomonocarboxylic acid having hydrogen on the alpha carbon, the polyvalent metal having an absolute valence $n$, both $m$ and $n$ being plural integers and totalling at least five, said polymer being cross-linked through said polyvalent metal present in six-membered chelate rings formed on different polymer chains, said metal being a common member of said chelate rings, each of said rings having an atom of the polyvalent metal linked to both the carbonylic and carboxylic oxygen atoms of a single β-ketoacyloxy unit.

References Cited in the file of this patent

UNITED STATES PATENTS

| | | |
|---|---|---|
| 1,864,909 | Jaeger | June 28, 1932 |
| 1,878,112 | Cooper et al. | Sept. 20, 1932 |
| 2,615,860 | Burgess | Oct. 28, 1952 |
| 2,659,711 | Wilkins et al. | Nov. 17, 1953 |
| 2,665,265 | Burgess | Jan. 5, 1954 |
| 2,693,484 | Cummings et al. | Nov. 2, 1954 |

FOREIGN PATENTS

| | | |
|---|---|---|
| 582,899 | Great Britain | Dec. 2, 1946 |
| 582,900 | Great Britain | Dec. 2, 1946 |

UNITED STATES PATENT OFFICE
CERTIFICATE OF CORRECTION

Patent No. 2,933,475 April 19, 1960

Fred W. Hoover et al.

It is hereby certified that error appears in the printed specification of the above numbered patent requiring correction and that the said Letters Patent should read as corrected below.

Column 2, line 43, for "crosslinkabe" read -- crosslinkable --; column 6, line 10, for "stagle" read -- stable --; column 7, line 28, for "pepntanediono)-alumi-" read -- pentanediono)alumi- --; line 66, for "filming-forming" read -- film-forming --; column 8, line 32, for "non-cheleating" read -- non-chelating --; column 9, line 70, for "parts" read -- part --; column 10, line 18, for "acetacetate" read -- acetoacetate --; line 23, for "bis(6-hydroxyhexyl)-adipate" read -- bis(6-hydroxyhexyl)adipate --; line 53, for "over" read -- oven --; column 12, line 9, after "acyclic" strike out "or"; line 71, for "hydroxy" read -- hydroxyl --; column 15, line 9, for "Film" read -- Films --; line 35, for "intraact-" read -- intract- --.

Signed and sealed this 27th day of September 1960.

(SEAL)
Attest:
KARL H. AXLINE
Attesting Officer

ROBERT C. WATSON
Commissioner of Patents